Dec. 27, 1966   S. L. STILLMAN, JR   3,294,894
MECHANICAL FASTENER FOR ELECTRICAL CABLES WITH AN INSERT
HAVING MUTUALLY CONFORMING UNDULANT SURFACES
Filed Sept. 15, 1964   3 Sheets-Sheet 2

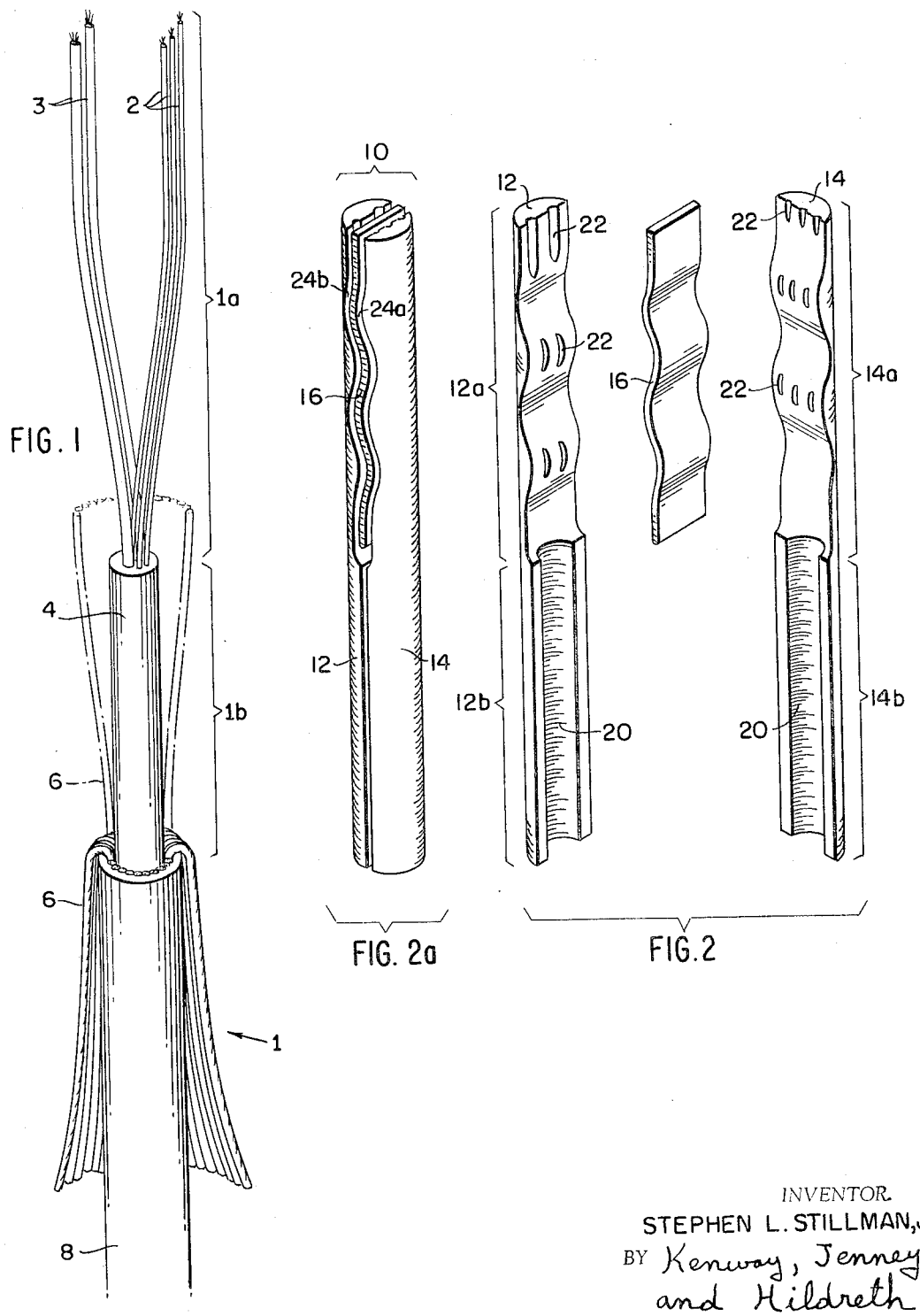

INVENTOR.
STEPHEN L. STILLMAN, JR.
BY Kenway, Jenney
and Hildreth
ATTORNEYS

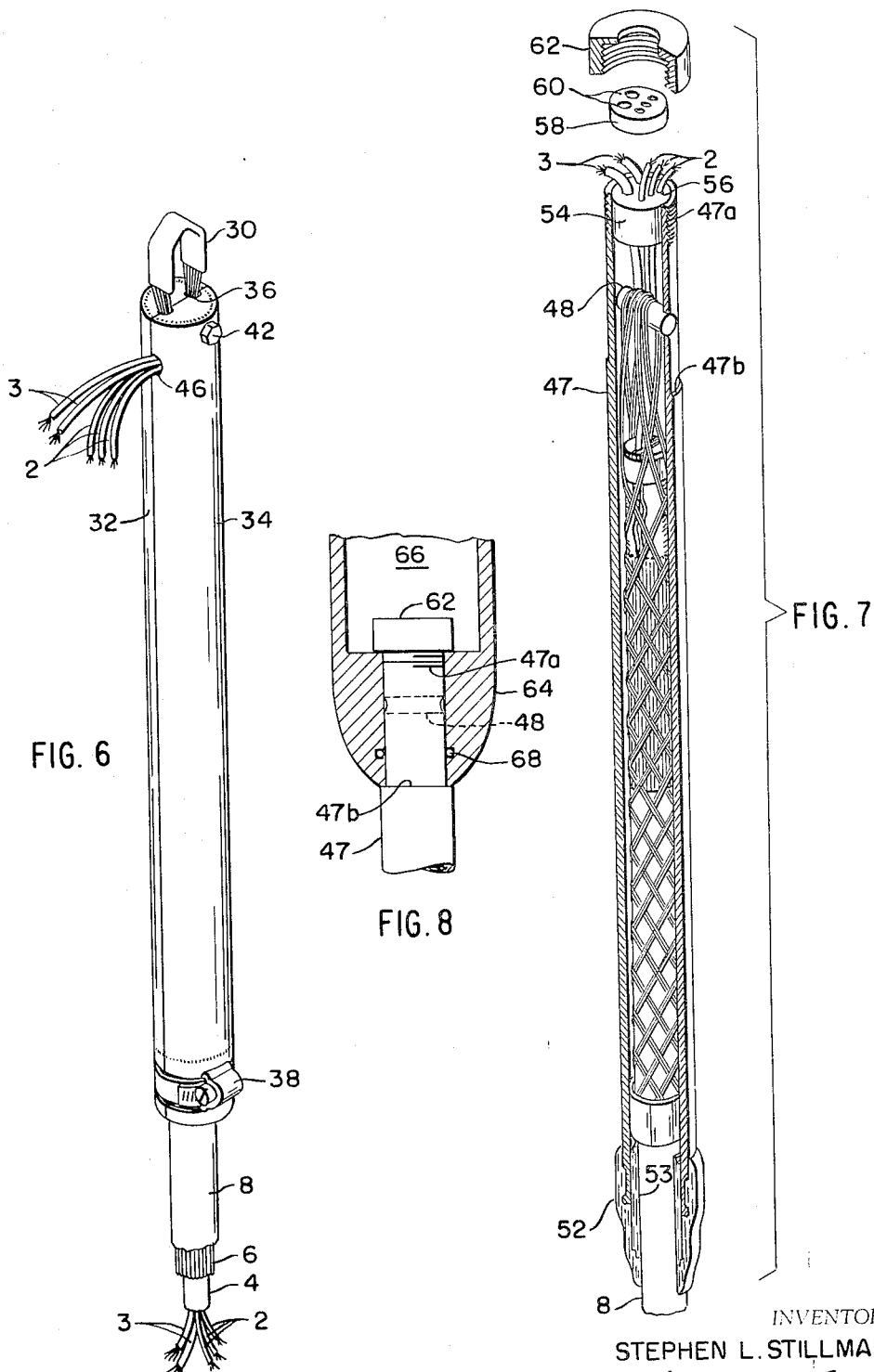

UNITED STATES PATENT OFFICE 3,294,894
Patented Dec. 27, 1966

3,294,894
MECHANICAL FASTENER FOR ELECTRICAL CABLES WITH AN INSERT HAVING MUTUALLY CONFORMING UNDULANT SURFACES
Stephen L. Stillman, Jr., North Falmouth, Mass., assignor to Woods Hole Oceanographic Institution, Woods Hole, Mass., a corporation of Massachusetts
Filed Sept. 15, 1964, Ser. No. 396,693
16 Claims. (Cl. 174—79)

The present invention relates generally to fastening means for a multi-layered and multi-stranded cable, and more specifically to fastening means for a cable which is subjected to axial loads during attachment. Such means have many and varied applications, and a typical use of the invention is to fasten a marine cable to a support so that it may be suspended therefrom under tension.

With a typical conventional fastening means for a cable comprising several conductors and coaxial layers of insulating and strengthening members, the strength members of the cable are potted together and attachment is made by clamping in some manner to the potted shape. A disadvantage of this method is that the strengthening layers are put under axial load which causes them to stretch and elongate, while the unloaded layers of insulating material and the conductors do not stretch. A difference in elongation readily occurs because there is often a low coefficient of friction between the coaxial parts. A possible effect of this action is the electrical disconnection of the conductors from the support. In addition, cable shape distortion at its ends due to the differential elongation may tend to loosen the clamp or fastening.

Another disadvantage of the prior art method is that it takes a long time to assemble the fastening to the cable, and it is difficult to accomplished the assembly, especially on a rolling ship, because of the necessary use of potting liquids.

With these disadvantages of the prior art method in mind, an object of this invention is to provide a fastening means for a multi-layered and multi-stranded cable to cause all of the concentric layers to be engaged so as to resist the axial load.

Another object is to prevent the slipping of certain of the layers with respect to the others, thus to prevent disconnection of the electrical conducting wires due to axial strain.

A still further object is to provide a structure of inexpensive, uncomplicated design and rugged construction, adapted to withstand great pressures, having easy and quick construction and good dependability of performance.

With the above and other objects hereinafter appearing in view, a feature of this invention includes the use of an insert assembly of undulant members to engage the individual wires or conductors. The insert assembly holds the electrical wires to their respective breaking strengths and prevents slipping of the these layers relative to the other layers, thus preventing disconnection of the wires due to tensile loading.

Another feature is the combination of the insert assembly with a basket weave grip which applies gripping pressure to all the layers of the cable and the insert assembly.

Still another feature includes the use of a housing tube which encases the basket weave grip, the cable and the insert assembly.

A further, resultant feature of this invention resides in its simplicity of construction, whereby the parts may be easily fabricated and assembled.

Other features comprise certain features of construction, modes of operation, arrangements and relationships of the parts which will be more clearly understood from the following description, and more specifically defined in the claims.

In the drawings,

FIG. 1 shows a typical multi-layered and multi-stranded cable prepared for application of the fastener;

FIG. 2 shows the three unassembled sections of the insert assembly;

FIG. 2a shows the three sections in assembled position;

FIG. 6 shows the assembled preferred embodiment of the invention;

FIG. 7 shows an alternative embodiment of the invention employing a sealed housing tube encasing the basket-weave grip; and FIG. 8 is a fragmentary view partly in section showing how the tensile load is carried.

Figure 3:
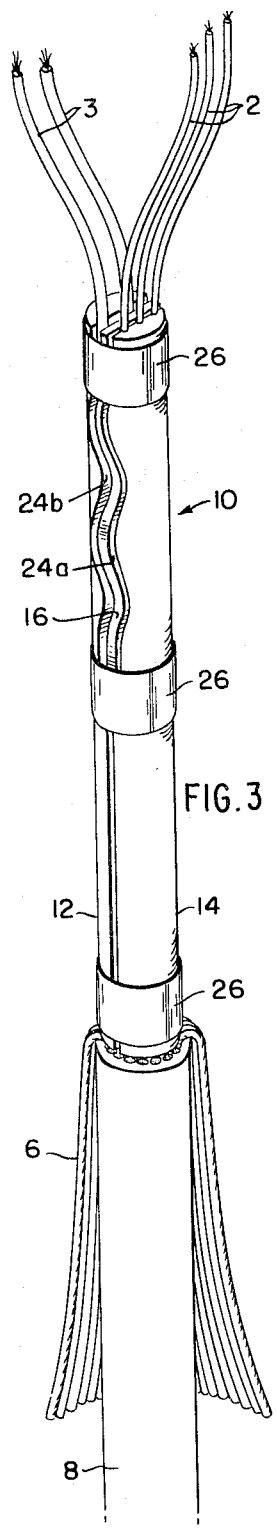
FIG. 3 shows the insert assembly fitted upon the multi-layered and multi-stranded cable of FIG. 1.

Referring to a typical multi-layered and multi-stranded cable shown for illustrative purposes at 1 in FIG. 1, the innermost layer is comprised of a number of insulated electrical wires 2 of the same diameter, and additional insulated wires 3 of a different diameter than the wires 2. This layer of insulated electrical wires is covered by a layer 4 of plastic material such as polyethylene. The layer 4 is usually molded to the wires 2 and 3 and has a cylindrical outer surface. It is covered by a layer of strength members 6 which may be of plastic and which in turn are covered by an outer covering layer 8 of any suitable material such as polypropylene.

The cable is prepared for application of the present invention by removing various parts of the layers to be fastened as indicated in FIG. 1, thus exposing the wires in a region 1a and the layer 4 in a region 1b.

The cable is then ready for the application of the insert assembly, the several sections of which are shown in FIG. 2. These sections are preferably molded of polyvinyl chloride resin or any other material having suitable resistance to chemical degradation by the surrounding medium and also having adequate strength, flexibility and relatively low cost. The complete assembly as shown at 10 in FIG. 2a is composed of contour-matched outer sections 12 and 14, and a spacer 16. The sections 12 and 14 are each divided into two parts, respectively designated at 12a and 12b for the section 12 and 14a and 14b for the section 14. The parts 12b and 14b equal in length the region 1b of the prepared cable, while the parts 12a and 14a are somewhat shorter than the wires in the region 1a. The parts 12b and 14b comprise semi-cylinders each having generally annular internal grooves 20, the internal diameter being such that the two sections may be fitted about the layer 4 of the cable, forming a tight encasement. Preferably, the internal clearance diameter of the parts 12b and 14b is slightly less than the diameter of the layer 4 so that upon fitting these parts together the layer 4 is compressed into the grooves 20.

The parts 12a and 14a have matching undulant inner surfaces comprising waves in the plastic material, and many also include longitudinally-oriented guide grooves 22 for the wires as shown. The spacer 16 is substantially coextensive with and conforming to the parts 12a and 14a. The spacer is preferably of uniform thickness and has undulant surfaces matching the opposed parts 12a and 14a. When the sections 12 and 14 and the spacer 16 are fitted together to form the complete insert 10, the parts 12a and 14a with the spacer define interference paths 24a and 24b for the insulated wires 2 and 3, respectively. Each of these paths has the same width as the diameter of the insulated wires passing through it. Thus the path 24a has a width equal to the diameter of the wires 2 and the path 24b has a width equal to the diameter of the wires 3.

A preferred method of insertion is to fit the parts together so that the layer 4 in the region 1b of the cable is compressed into the grooves 20 and the insulated wires 2 and 3 are placed along the undulant surfaces of the parts 12a and 14a, respectively, and into the guide grooves 22. For this purpose the number of grooves equals the number of wires of the particular diameter. The spacer 16 is inserted between the parts 12a and 14a so as to clamp the wires firmly against the undulant surfaces of the insert. The insert assembly is held compressed and temporarily taped with adhesive tape 26 at spaced intervals as indicated in FIG. 3.

When the assembly is as shown in FIG. 3, the layer 4 is held from slipping by compression into the grooves 20 and the wires 2 and 3 are held from slipping in the interference paths 24a and 24b, respectively, there being one interference path for each wire diameter. The shape of each interference path is such that the slope of the path is continuously changing, thus providing maximum resistance to a longitudinal motion of the wires. The portion of the cable assembly including the insert has a diameter greater than that of the layer 4, and smaller than that of layer 8, and has a cylindrical shape.

Figure 4:
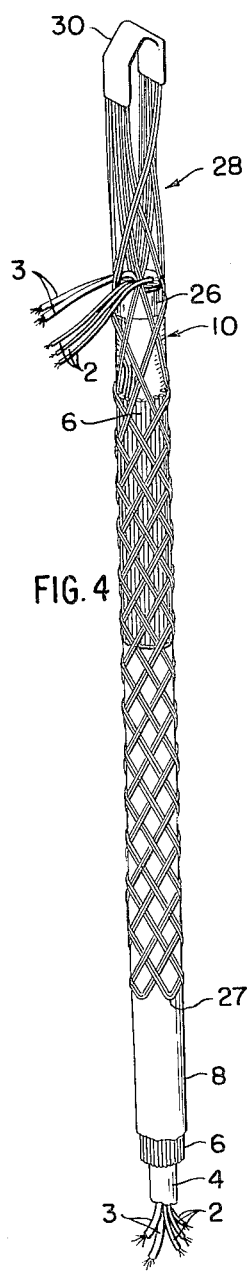
FIG. 4 shows the basket weave grip encasing and gripping the cable and insert assembly.

In the next step of assembly, the strength members 6 are placed over the insert in the same arrangement as they had over the layer 4 in the cable, and a wire, rope or plastic basket weave grip 28 of well-known woven configuration and appropriate length is placed over the strength members 6 as shown in FIG. 4. The strands of one end of the grip 28 extend past the end of the insert assembly and are fastened together into a grip handle 30. With the assembly in the condition of FIG. 4, as an axial load is applied to the grip handle 30, the basket-weave grip constricts to apply radial pressure on the insert assembly and to the strength members which cover it. Thus, as an axial load is applied to the cable through the grip handle 30, each layer of the cable is firmly held to its breaking strength. The insulated wires 2 and 3 are kept from slipping longitudinally because of the resistance to such slipping provided by the undulant interference paths 24a and 24b, and the layer 4 is kept from slipping longitudinally by compression into the grooves 20 of the insert assembly. The insert assembly is then held from slipping by direct contact with the basket weave grip.

Figure 5:
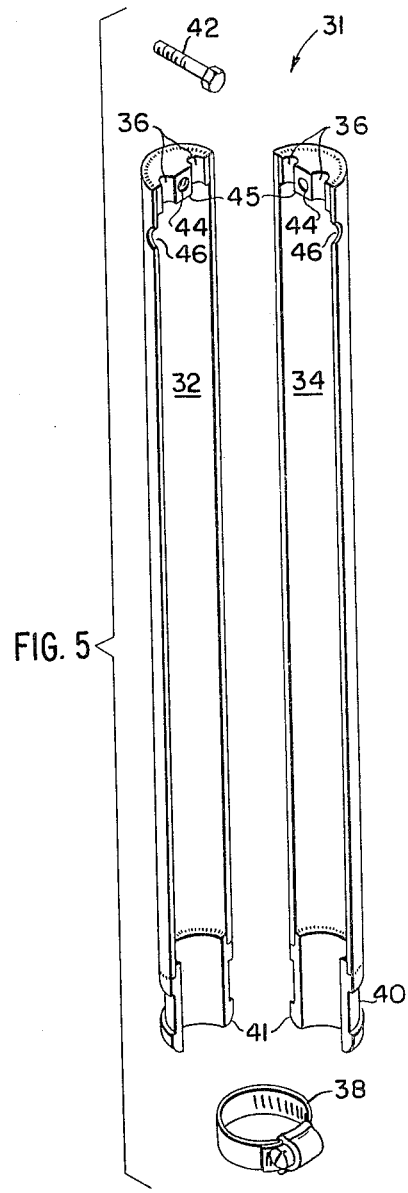
FIG. 5 shows two halves of a free-flooding housing tube, used in a preferred embodiment of the invention.

The assembled combination comprising the cable, the insert assembly and the basket-weave grip as shown in FIG. 4 is placed into a free-flooding housing tube 31 shown in FIG. 5. The tube 31 is cylindrical in shape and is constructed of two halves 32 and 34. The lower end of the tube as viewed in the drawing is open to allow for the cable and the other end is closed except for two apertures 36 which allow the end of the basket-weave grip 28, with the grip handle 30, to extend out of the housing tube. The open end of the tube, after fitting about the cable, is fastened together with a clamp 38 which fits into a clamp groove 40 formed in end members 41 integral with the tube. The inside diameter of the fitting 41 is smaller than the outside diameter of the basket weave grip assembled as shown in FIG. 4, and exerts a clamping force upon the weave at the end 27 (FIG. 4), creating initial holding friction between the weave and the cable 8. The other end of the tube is fastened together with a screw or bolt 42 threaded in a hold 44 passing through end members 45 also integral with the tube. The wires 2 and 3 are brought out through an aperture 46 as shown in FIG. 6, which shows the completed assembly. It will be evident that the assembly is free-flooding since the meeting surfaces of the tube halves do not form a water-tight seal.

A second embodiment of the invention is shown in FIGS. 7 and 8 wherein the construction is the same as that described above up to and including the assembly of FIG. 4. The housing tube in this embodiment is a unitary cylindrical member 47 sealed at both ends, and having external threads 47a at one end, said end being of slightly reduced outer diameter with a shoulder 47b. The grip handle 30 of the basket weave grip 28 is fastened internally to the housing by a drive pin 48.

After the assembly of FIG. 4 has been inserted into one end of the tube 47 and the grip handle 30 has been fastened to the tube with the pin 48, the unthreaded end of the tube is made watertight by a seal 52, which may be waterproof tape or other suitable material. To assist in making this primary seal watertight, a layer 53 of tape may be applied to the cable so as to extend within the end of the tube and under the seal 52.

A rubber plug 54 with holes 56 is fitted into the threaded end of the tube 47, having a push fit therein. The wires extend out of the tube through the holes 56, the rubber plug forming a sealed fit about the wires. A metal spacer 58 with holes 60 is placed on top of the seal 54 and the wires extended through the spacer holes. Finally, a threaded cap 62 with a center hole for the wires is threaded on to the tube 47 so as to retain the spacer 58 and plug 54, thereby forming a second water-tight seal.

The assembly of FIG. 7 may be attached to a support by means of a fitting as shown in FIG. 8. With the cap 62 removed, a fitting 64 having a hollow portion 66 and a hole connected therewith is received over the threaded end of the tube 47 and against the shoulder 47b. The cap 62 is then threaded on to the tube as shown to retain the cable in the fitting. In this position, an O-ring 68 in an inner annular recess of the fitting provides a seal to prevent leakage of water into the tube around the pin 48. The support is held so that the cable may be immersed while the portion 66 thereof is out of the water.

It will be understood that although the illustrated multi-layered and multi-stranded cable of FIG. 1 contains only two different wire sizes, the invention may be adapted for one size or three or more sizes. For one size the spacer 16 is eliminated. For three or more sizes there are preferably two or more spacers. If the insert assembly contains "$n$" spacers 16, it will provide $n+1$ interference paths and therefore will be adapted for use with a cable that has $n+1$ wire sizes.

It will be further understood that the shape of the insert may be varied to fit the needs of a particular cable construction. The diameter of the insert may be increased or decreased to fit the diameter of the cable. Longer or shorter inserts may be fashioned to develop the needed holding power on various parts of the cable. The basket weave grip may also be varied in diameter and length to fit various size cables.

Other variations in structure and design, which will occur to those familiar with this art, may also be employed without departing from the spirit or scope of the invention.

Having thus described the invention, I claim:

1. A fastener for a cable having a wire surrounded by a covering layer, comprising the combination of an insert having a plurality of sections with mutually conforming undulant surfaces and adapted for fitting about a length of the cable stripped of said covering, thereby imparting an undulant curvature to the wire, and means to grip the cable by applying radial pressure to the insert and to the contiguous covering of the cable.

2. The combination according to claim 1, in which the gripping means is a basket-weave grip.

3. The combination according to claim 1, in which the insert has a pair of sections each having a generally semicylindrical outer surface and an undulant inner surface conforming to that of the other section.

4. A fastener for a cable having at least two wires surrounded by a covering layer, comprising the combination of an insert having a pair of sections each having an undulant inner surface conforming to that of the other section and an undulant spacer between said sections for separating said wires, and means to grip the cable by applying radial pressure to the insert and to the contiguous covering of the cable.

5. The combination according to claim 4, in which the gripping means is a basket-weave grip.

6. The combination according to claim 4, in which the wires are of differing diameters and the spacer and pair of sections form interference paths of correspondingly differing widths.

7. A fastener for a cable having a wire surrounded by an inner covering layer and an outer covering layer, comprising the combination of an insert having a plurality of sections each including a generally semicylindrical inner surface portion and an undulant inner surface portion, the sections being adapted for fitting together about a length of the cable with their semicylindrical inner surface portions gripping a first length of the cable stripped of the outer covering layer and their undulant surface portions gripping a second length of the cable stripped of the inner and outer covering layers, thereby imparting an undulant curvature to the wire, and means to grip the cable by applying radial pressure to the insert.

8. The combination according to claim 7, in which the gripping means applies radial pressure to the insert and to the contiguous outer covering of the cable.

9. The combination according to claim 7, in which the semicylindrical inner surface portions of the insert sections have generally annular grooves for gripping the inner covering.

10. The combination according to claim 7, in which the gripping means is a basket-weave grip.

11. The combination according to claim 7, in which the gripping means is a basket-weave grip passing over the insert and having one end passing over the contiguous outer covering of the cable and the other end adapted for fastening to a support.

12. The combination according to claim 7, in which the gripping means is a basket-weave grip passing over the insert and having one end passing over the contiguous outer covering of the cable and the other end adapted for fastening to a support, and further having a sheath covering the basket-weave grip except for the end adapted for fastening to a support.

13. The combination according to claim 7, in which the gripping means is a basket-weave grip passing over the insert and having one end passing over the contiguous outer covering of the cable and the other end adapted for fastening to a support, and further having a sheath covering the basket-weave grip and having means for internally engaging the end thereof adapted for fastening to a support.

14. A mechanical fastener for a cable, having, in combination, a three-layer undulant insert to house the individual wires, a basket weave grip to grip the cable and the insert, a housing tube to encase the basket-weave grip, an adjacent portion of the cable and the insert, and means for application of tension to one end of the basket weave grip, whereby all parts of the cable to be fastened are held to their respective breaking strengths.

15. The combination according to claim 14, in which the housing tube is free-flooding and one end of the basket-weave grip extends outside the tube and is adapted for attachment to a support.

16. The combination according to claim 14, in which the housing tube has internal means for attaching to an end of the basket-weave grip, and means to provide a watertight seal at each end of the tube.

No references cited.

LEWIS H. MYERS, *Primary Examiner.*

J. F. RUGGIERGO, *Assistant Examiner.*